(12) United States Patent
Sakemi

(10) Patent No.: US 10,747,870 B2
(45) Date of Patent: Aug. 18, 2020

(54) AUTHENTICATION MANAGEMENT SYSTEM, MANAGEMENT, APPARATUS, AND AUTHENTICATION MANAGEMENT METHOD

(71) Applicant: Satoshi Sakemi, Kanagawa (JP)

(72) Inventor: Satoshi Sakemi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 287 days.

(21) Appl. No.: 15/897,245

(22) Filed: Feb. 15, 2018

(65) Prior Publication Data

US 2018/0247048 A1 Aug. 30, 2018

(30) Foreign Application Priority Data

Feb. 28, 2017 (JP) ................................. 2017-036771

(51) Int. Cl.
*G06F 21/45* (2013.01)
*H04L 29/06* (2006.01)
(Continued)

(52) U.S. Cl.
CPC .............. *G06F 21/45* (2013.01); *G06F 21/34* (2013.01); *G06F 21/35* (2013.01); *G06F 21/608* (2013.01);
(Continued)

(58) Field of Classification Search
CPC ........ G06F 21/34; G06F 21/608; G06F 21/45; G06F 21/35; H04L 63/0853; H04L 63/083; H04L 63/102
See application file for complete search history.

(56) References Cited

U.S. PATENT DOCUMENTS

| 6,772,945 B2 * | 8/2004 | Mahoney | G06F 3/0227 235/380 |
| 8,365,265 B2 * | 1/2013 | Ueno | G06F 21/34 380/243 |

(Continued)

FOREIGN PATENT DOCUMENTS

| JP | 2006-202063 | 8/2006 |
| JP | 2010-086205 | 4/2010 |

OTHER PUBLICATIONS

Ching-Te Wang, Chin-Chen Chang and Chu-Hsing Lin, "Using IC cards to remotely login passwords without verification tables," 18th International Conference on Advanced Information Networking and Applications, 2004. AINA 2004., Fukuoka, Japan, 2004, pp. 321-326 vol. 1. (Year: 2004).*

(Continued)

*Primary Examiner* — Kari L Schmidt
(74) *Attorney, Agent, or Firm* — Harness, Dickey & Pierce, P.L.C.

(57) ABSTRACT

An authentication management system includes a plurality of authentication apparatuses disposed at different locations, each of the authentication apparatuses being configured to perform authentication processing on each user who requests to use a machine, and a management apparatus connectable to the plurality of authentication apparatuses via a network, to manage authentication information of each user registered in each of the plurality of the authentication apparatuses.

9 Claims, 9 Drawing Sheets

(51) Int. Cl.
*G06F 21/60* (2013.01)
*G06F 21/35* (2013.01)
*G06F 21/34* (2013.01)

(52) U.S. Cl.
CPC ........ *H04L 63/083* (2013.01); *H04L 63/0853* (2013.01); *H04L 63/102* (2013.01); *G06F 2221/2117* (2013.01)

(56) References Cited

U.S. PATENT DOCUMENTS

| | | | | |
|---|---|---|---|---|
| 9,608,970 | B1* | 3/2017 | Gehret | H04W 12/04 |
| 9,883,381 | B1* | 1/2018 | Katzer | H04W 12/0608 |
| 2002/0026397 | A1* | 2/2002 | Ieta | G06Q 20/4037 |
| | | | | 705/35 |
| 2004/0093523 | A1* | 5/2004 | Matsuzaki | G06F 21/10 |
| | | | | 726/10 |
| 2006/0101509 | A1* | 5/2006 | Bossemeyer, Jr. | G06Q 20/02 |
| | | | | 726/9 |
| 2006/0264240 | A1* | 11/2006 | Arai | H04L 63/101 |
| | | | | 455/558 |
| 2006/0277599 | A1* | 12/2006 | Lamplough | H04N 1/32101 |
| | | | | 726/5 |
| 2007/0132548 | A1* | 6/2007 | Baraz | G06Q 20/06 |
| | | | | 340/5.6 |
| 2008/0231887 | A1* | 9/2008 | Sakagami | H04N 1/00204 |
| | | | | 358/1.15 |
| 2009/0006652 | A1* | 1/2009 | Kasatani | H04N 1/00204 |
| | | | | 709/248 |
| 2009/0078759 | A1* | 3/2009 | Watanabe | G06Q 20/409 |
| | | | | 235/380 |
| 2009/0138367 | A1* | 5/2009 | Okawa | G06Q 20/02 |
| | | | | 705/26.1 |
| 2009/0300757 | A1* | 12/2009 | Tanaka | G06F 21/608 |
| | | | | 726/20 |
| 2010/0002250 | A1* | 1/2010 | Sakagami | H04N 1/0035 |
| | | | | 358/1.14 |
| 2010/0027046 | A1* | 2/2010 | Maeda | G03G 15/5066 |
| | | | | 358/1.14 |
| 2010/0064343 | A1* | 3/2010 | Konagaya | H04L 9/32 |
| | | | | 726/2 |
| 2010/0299737 | A1* | 11/2010 | Ueno | G06F 21/31 |
| | | | | 726/7 |
| 2011/0173686 | A1* | 7/2011 | Ueno | H04N 1/00204 |
| | | | | 726/6 |
| 2012/0099136 | A1* | 4/2012 | Ueda | G06Q 20/346 |
| | | | | 358/1.14 |
| 2013/0152173 | A1* | 6/2013 | Raley | G06F 21/31 |
| | | | | 726/4 |
| 2013/0152174 | A1* | 6/2013 | Raley | G06F 21/31 |
| | | | | 726/4 |
| 2013/0157617 | A1* | 6/2013 | Piratla | H04W 12/08 |
| | | | | 455/411 |
| 2013/0159301 | A1* | 6/2013 | Okada | G06F 21/10 |
| | | | | 707/736 |
| 2014/0033287 | A1* | 1/2014 | Kawai | H04L 63/083 |
| | | | | 726/7 |
| 2015/0007300 | A1* | 1/2015 | Kim | G06F 21/33 |
| | | | | 726/9 |
| 2015/0096015 | A1* | 4/2015 | Ren | G06F 21/35 |
| | | | | 726/20 |
| 2015/0206129 | A1* | 7/2015 | Perez Lafuente | H04L 63/0807 |
| | | | | 705/44 |
| 2015/0301772 | A1* | 10/2015 | Nakajima | G06F 3/1207 |
| | | | | 358/1.15 |
| 2015/0379243 | A1* | 12/2015 | Drake | G06F 21/10 |
| | | | | 726/28 |
| 2016/0275282 | A1* | 9/2016 | Araki | G06F 21/45 |
| 2016/0321443 | A1* | 11/2016 | Ishibashi | G06F 16/275 |
| 2017/0201876 | A1* | 7/2017 | Tamagawa | G06Q 50/32 |
| 2019/0205509 | A1* | 7/2019 | Yamashita | G06F 21/31 |
| 2019/0386826 | A1* | 12/2019 | Kato | H04W 12/06 |

OTHER PUBLICATIONS

F. C. Sasso, R. A. R. d. Moraes and J. E. Martina, "A Proposal for a Unified Identity Card for Use in an Academic Federation Environment," 2014 Ninth International Conference on Availability, Reliability and Security, Fribourg, 2014, pp. 265-272. (Year: 2014).*

Shen, Jie, et al. "A Universal Application Storage System Based on Smart Card." ACM Transactions on Embedded Computing Systems (TECS) 15.4 (2016): 1-26. (Year: 2016).*

* cited by examiner

| UPPER LIMIT |
|---|
| 3 |

| USER NAME (611) | REGISTRATION NUMBER (612) |
|---|---|
| aaa@domainA | 2 |
| bbb@domainA | 1 |
| aaa@domainB | 1 |
| bbb@domainB | 0 |
| ... | ... |

| CARD ID (701) | USER NAME (702) |
|---|---|
| 0001 | aaa |
| 0002 | aaa |
| 0003 | bbb |
| 0004 | aaa |
| ... | ... |

| USER NAME (711) | PASSWORD (712) |
|---|---|
| aaa | 1wd5a |
| bbb | dy693 |
| ... | ... |

| USER NAME (801) | REGISTRATION VALIDITY (802) |
|---|---|
| aaa | NO (NOT-VALID) |
| bbb | YES (VALID) |
| ... | ... |

AUTHENTICATION MANAGEMENT SYSTEM, MANAGEMENT, APPARATUS, AND AUTHENTICATION MANAGEMENT METHOD

CROSS-REFERENCE TO RELATED APPLICATION

This application claims priority pursuant to 35 U.S.C. § 119(a) to Japanese Patent Application No. 2017-036771, filed on Feb. 28, 2017, in the Japan Patent Office, the disclosure of which is incorporated by reference herein in its entirety.

BACKGROUND

Technical Field

This disclosure relates to an authentication management system, an authentication apparatus, a management apparatus for managing the authentication apparatus, and an authentication management method.

Background Art

Authentication management systems verify an access right of each user to each image forming apparatus by using integrated circuit (IC) cards. For example, in the authentication management system, a card reader attached to an image forming apparatus reads an IC card when a user brings the IC card into proximity to the card reader, and the card reader transmits identification information of the IC card (hereinafter, card ID) read from the IC card to an authentication server. Then, the authentication server determines whether the received card ID is already registered or not in the authentication server. When the authentication server determines that the received card ID is already registered in the authentication server, the authentication server transmits a message of authentication success to the image forming apparatus. When the image forming apparatus receives the message of authentication success, the image forming apparatus cancels the restriction on use of functions such as copying and scanning based on the access right of the user.

As to the authentication management system, the card ID used for the authentication is required to be registered in the authentication server in advance. Further, the authentication management system can be configured to register a new IC card at an image forming apparatus when a user is to obtain an access right of the image forming apparatus while the new IC card is not yet registered.

SUMMARY

In one aspect of the present invention, an authentication management system is devised. The authentication management system includes a plurality of authentication apparatuses disposed at different locations, each of the authentication apparatuses being configured to perform authentication processing on each user who requests to use a machine, and a management apparatus connectable to the plurality of authentication apparatuses via a network, to manage authentication information of each user registered in each of the plurality of authentication apparatuses. Each of the plurality of authentication apparatuses includes a first memory to store the authentication information including one or more identification information of each user, the authentication information is used for authenticating each user when each user is to use the machine, and first circuitry to receive a request for determining whether a user at the machine is authenticated to use the machine, in response to receiving authentication information input by the user via the machine, perform the authentication processing on the received authentication information of the user, and transmit, to the management apparatus, a request for determining whether to allow an additional registration of the received authentication information of the user that is not yet stored in the first memory. The management apparatus includes a second memory to store authentication information including one or more identification information of each user, the authentication information is used for authenticating each user when each user is to use the machine, and second circuitry to in response to receiving the request for determining whether to allow the additional registration from the authentication apparatus, determine whether the additional registration of the received authentication information of the user is allowed based on the number of authentication information of the user already stored in the second memory, transmit a determination result indicating whether the additional registration of the received authentication information of the user is allowed or not allowed to the authentication apparatus, and register the authentication information of the user additionally in the second memory when the determination result indicates that the additional registration of the received authentication information of the user is allowed.

In another aspect of the present invention, a management apparatus connectable with a plurality of authentication apparatuses disposed at different locations, each of the authentication apparatuses being configured to perform authentication processing on each user who requests to use a machine is devised. The management apparatus includes a memory to store authentication information including one or more identification information of each user, the authentication information is used for authenticating each user when each user is to use the machine, and circuitry to, in response to receiving a request for determining whether to allow the additional registration of the authentication information received from the authentication apparatus, determine whether the additional registration of the received authentication information of the user is allowed based on the number of authentication information of the user already stored in the second memory, transmit a determination result indicating whether the additional registration of the received authentication information of the user is allowed or not allowed to the authentication apparatus, and register the authentication information of the user additionally in the second memory when the determination result indicates that the additional registration of the received authentication information of the user is allowed.

In another aspect of the present invention, a method of managing authentication information of each user by using a plurality of authentication apparatuses, each of the authentication apparatuses, connected with a managing apparatus, configured to perform authentication processing on each user who requests to use a machine is devised. The method includes storing authentication information including one or more identification information of each user in a memory, the authentication information is used for authenticating each user when each user is to use the machine, receiving, from the authentication apparatus, authentication information of a user, input to the authentication apparatus by the user, and a request for determining whether the user at the machine is authenticated to use the machine, performing the authentication processing on the received authentication information of the user, receiving, from the authentication apparatus, a request for determining whether to allow an additional registration of the authentication information of the user that is not yet stored in the memory, determining whether the additional registration of the received authentication information of the user is allowed based on the number of authentication information of the user already stored in the memory, transmitting a determination result indicating whether the additional registration of the received authentication information of the user is allowed or not allowed to the authentication apparatus, and registering the authentication information of the user additionally in the memory when the determining determines that the additional registration of the received authentication information of the user is allowed.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 6A illustrates an example of a upper limit definition file;

FIG. 6B illustrates an example of a upper limit management table;

FIG. 7A illustrates an example of a card management table stored and managed by a management server;

FIG. 7B illustrates an example of an authentication information table;

FIG. 8 illustrates an example of a table configuration for managing registration of a user according to an embodiment of the present invention.

DETAILED DESCRIPTION

Figure 1:
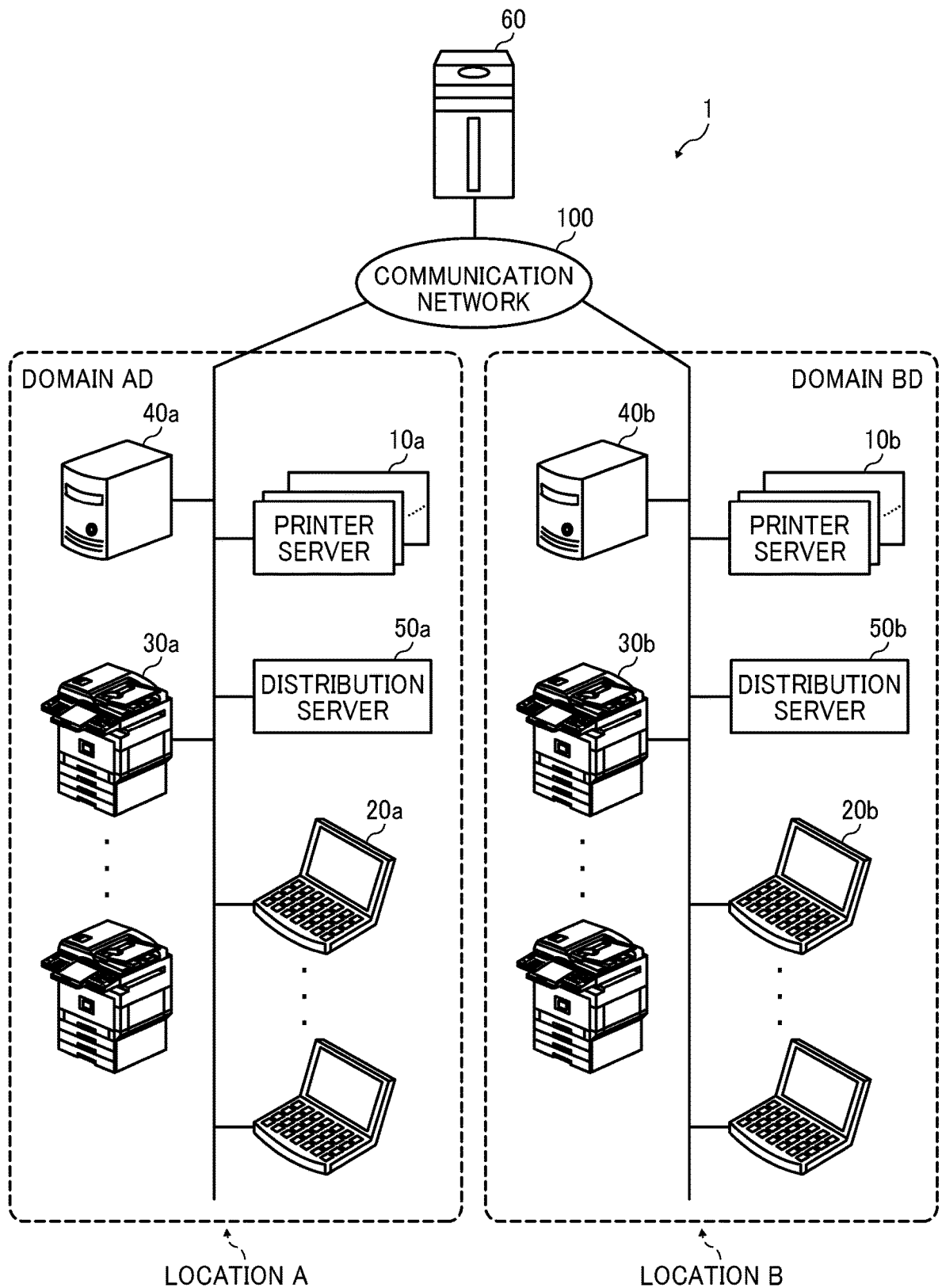
FIG. 1 illustrates an example of a schematic configuration of an authentication management system according to an embodiment of the present invention.

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Conventionally, when a plurality of image forming apparatuses is configured as one integrated system, an authentication server may perform authentication processing of the plurality of image forming apparatuses. Further, when one organization operates at domestic locations and overseas locations, a large-scale system is configured to manage a number of image forming apparatuses at the domestic locations and overseas locations, in which an authentication server is installed at each location to perform the authentication processing for a group of the image forming apparatuses managed by the authentication server. In this case, each authentication server individually manages data used for authentication processing such as a card ID, a user name, and a password of each user.

When the authentication server at each location manages data used for authentication processing individually at each location, users who travel between the different locations need to own an IC card that can be used at each location, and thereby each user may own a plurality of IC cards.

Further, when companies are merged and/or business units are integrated, users may want to continuously use IC cards that have been used in the previous company even after the merger and/or integration. In this case too, users who travel between the locations need to own an IC card that can be used at each location, and thereby each user may own a plurality of IC cards.

Thus, when one user owns a plurality of IC cards, the management of IC cards becomes complicated for each user, and possibility of losing the IC cards increases as the number of the IC card increases. In order to prevent such situations, it is desirable to limit the number of IC cards owned by one user, and to rent a temporal IC card at a location or workplace where a user temporarily visits.

In order to cope with such a demand, it can be assumed that the maximum number of IC cards that one user can register is limited to three for the entire system. It is also assumed that the IC card is registered at each image forming apparatus by applying the above technique. In this system configuration, when one user X registers three cards for one authentication server (hereinafter, authentication server A) via an image forming apparatus, information of the three card is managed and stored by the authentication server A. When the one user X attempts to register another card (i.e., fourth card) in the authentication server A, the authentication server A rejects the registration of another card (i.e., fourth card) based on an upper limit of the number of registrable cards in the authentication server A. However, when the one user X attempts to register another card (i.e., fourth card) to another server (hereinafter, authentication server B) disposed at another location and/or workplace, another card (i.e., fourth card) can be registered at the authentication server B because the authentication server B does not store the card information registered in the authentication server A. Therefore, the number of IC cards that can register in the entire system exceeds the upper limit of the number of registrable cards.

In view of the above, the embodiments of the present invention provide a technique for integrally setting an upper limit of the number of registrable IC cards and controlling a registration determination of IC cards.

This disclosure describes a system including a plurality of authentication apparatuses and a plurality of image forming apparatuses, in which and each authentication apparatus performs the authentication processing for each one of users for one or more image forming apparatuses managed by each authentication apparatus, and the system sets an upper limit of the number of IC cards that can be registered for each one of the users within the entire system, and registers the IC cards of users by integrally controlling the authentication in the entire system.

Hereinafter, a description is given of one or more embodiments of the present invention with reference to the drawings. FIG. 1 illustrates an example of a schematic configuration of an authentication management system 1 according to an embodiment of the present invention.

(Authentication Management System)

In the authentication management system 1 illustrated in FIG. 1, each location such as a first location A and a second location B indicates, for example, a business location or a site such as each office and each factory in one company group. For example, the first location A may indicate an office or factory located in Japan, and the second location B may indicate an office or factory located in the United States. That is, each of the locations is located at a physically distant location. In an example case of FIG. 1, a domain of a network constructed at the first location A is referred to as a first domain AD, and a domain of a network constructed at the second location B is referred to as a second domain BD. In an example case of FIG. 1, two locations are exemplified, but not limited thereto. The number of locations can be three more. In an example case of FIG. 1, a suffix "a" is given to the end of the numerical sign of the apparatus disposed at the first location A, and a suffix "b" is given to the end of the numerical sign of the apparatus disposed at the second location B. In the following description, the suffixes "a" and "b" at the end of the numerical signs are omitted when each apparatus in the first location A and the second B are not distinguished.

As illustrated in FIG. 1, the authentication management system 1 is configured with a plurality of apparatuses disposed at each of different locations. That is, the authentication management system 1 includes, for example, one or more printer servers 10, one or more client terminals 20, one or more image forming apparatuses 300 such as multi-functional peripherals, an authentication servers 40 disposed at each location, a distribution server 50 disposed at each location, and a management server 60. The printer servers 10, the client terminals 20, the MFP 30, the authentication server 40 and the distribution server 50 disposed at each location, and the management server 60 are connected with each other via a communication network 100 such as local area network (LAN) or the Internet. In this configuration, the authentication server 40 is used as a local authentication server, which is an example of authentication apparatuses (first authentication apparatus), and the management server 60 is used as a central authentication server or a core authentication server, which is an example of management apparatuses (second authentication apparatus).

(Client Terminal)

The client terminal 20 is an example of information processing apparatuses used by a user that works at each location. The client terminal 20 employs, for example, a personal computer (PC). In the embodiment, the client terminal 20 has a function of storing print data and transmitting the print data to the printer server 10 disposed at the same location of the client terminal 20. Further, the client terminal 20 has a function of storing the print data in a storage device such as a memory disposed inside the client terminal 20 based on an operation of each user.

(Printer Server)

When the printer server 10 receives a print job transmitted from the client terminal 20, the printer server 10 stores print data included in the print job and print setting information including bibliographic information of the print job in a memory. In the embodiment, one or more of the printer servers 10 are disposed at each location. Further, the printer server 10 analyzes the print setting information associated with the received print data, and transmits user information associated with the print data to the management server 60. Further, the printer server 10 collects and displays information necessary to respond to the print data acquisition request from the MFP 30.

(MFP)

The MFP 30 is an example of machines having one or more specific functions to perform one or more operations. For example, the MFP 30 has a printing function. For example, when a user operates the MFP 30, the MFP 30 transmits an acquisition request of print data and print job management information to the printer server 10 disposed at the same location of the MFP 30. When the MFP 30 receives print data from the printer server 10, the MFP 30 executes a print job based on the print data, received from the printer server 10 as a response to the acquisition request. In this configuration, an administrator sets each MFP 30 with address information of each printer server 10 disposed at the same location of the MFP 30 in advance as a destination for transmitting a request for acquiring the print data and print job management information.

Each of the MFP 30 includes, for example, a card authentication module. When a user uses each of the MFP 30, the user waves or places his or her IC card on or over the card reader. If the authentication is success, the user is authenticated as a person that can use the MFP 30 based on an access right of the user.

The relationship between a card ID and a user identification (ID) (hereinafter, user name) is stored in the authentication server 40. In this configuration, the authentication of the user is performed at any of the authentication servers 40, which is set as an information reference destination in the MFP 30. Hereinafter, the authentication of a user that is performed so that the user can access and operate the MFP 30 based on the card ID stored in the IC card, which is referred to as "authentication in response to a request for use (user-initiated authentication)."

In addition, the MFP 30 provides a function of performing a registration of a new IC card at the image forming apparatus. When a non-registered IC card is waved or placed on or over the card reader, the MFP 30 automatically switches a mode to a new registration mode of the IC card.

Alternatively, the MFP 30 switches the mode to the new registration mode of the IC card when a user or administrator performs a given operation on the MFP 30. Further, similar to the printing function of the MFP 30, as to the authentication function of the MFP 30, the MFP 30 is set with address information of the authentication server 40 disposed at the same location of the MFP 30 as a destination for transmitting a request for authentication.

(Authentication Server)

The authentication server 40 is implemented by one or more information processing apparatuses. The authentication server 40 is a computer that certifies or verifies that a user who has made a request to execute a print job in the MFP 30 is the user who has an authenticated execution right.

(Distribution Server)

The distribution server 50 is implemented by one or more information processing apparatuses. The distribution server 50 is a computer that executes a predetermined workflow processing for target data such as data stored in the MFP 30, and data transmitted from the client terminal 20.

(Management Server)

The management server 60, which is used as a core server or central sever, is a computer communicably connected to the printer server 10, the authentication server 40, and the distribution server 50 via the communication network 100 such as the Internet or local area network (LAN). In the embodiment, the management server 60 stores a part or all of the user information managed and stored at the authentication server 40 disposed at each location. By integrally managing the number of IC cards owned by users at the management server 60, the number of IC cards owned by each user can be managed, and the upper limit of the number of IC cards registrable for each user throughout the entire system can be set. Typically, the IC card is rented to each user, and the IC card is used as an example of a medium storing authentication information used for authenticating the card-owner user as a legitimate user that is authorized to use the MFP 30. In the embodiment, a part or all operations of the new registration, updating, deleting, and retrieving or searching of the data are referred to as "management."

By applying the embodiment described in this description, even when a user is to register an IC card to use one MFP 30 associated with one authentication server 40 disposed at one location, which is different from a location where the user usually belongs, the number of cards registered for one user in the entire authentication management system 1 can be detected and checked. Further, the upper limit of the number of IC cards registrable for each user can be easily set in the authentication management system 1.

Further, a combination of the management server 60 and the authentication server 40 may be used as a configuration of the authentication management system 1, or a configuration of the management server 60 alone or a configuration of the authentication server 40 alone can be used as the configuration of the authentication management system 1.

In the embodiment, it is assumed that the authentication server 40a and the MFP 30a under a control of the authentication server 40a are disposed at one location such as the first location A, and the authentication server 40b and the MFP 30b under a control of the authentication server 40b are disposed at another location such as the second location B. In this case, the first location A managed and controlled by the authentication server 40a is referred to as first domain AD, and the second location B managed and controlled by the authentication server 40b is referred to as second domain BD.

The authentication server 40a stores data used for the authentication processing with respect to the MFP 30a, and functions as an authentication unit when the MFP 30a is used by a user. On the other hand, the authentication server 40a does not store data used for the authentication processing with respect to the MFP 30b, and does not function as an authentication unit for the MFP 30b.

The management server 60 is a server that collectively and integrally manages the authentication server 40 disposed at each location (i.e. a plurality of authentication servers 40). The management server 60 manages and maintains the number of IC cards registered for each one of users. Further, the management server 60 stores the upper limit of the number of registrable IC cards that one user can own throughout the entire system. The management server 60 performs data communication with the authentication server 40 disposed at each location via the communication network 100. The communication network 100 is a network configuration including, for example, a wide area communication network in the embodiment. Further, the management server 60 can be disposed at a location such as a data center that is remote from the authentication server 40 disposed at each location, and the function of the management server 60 can be provided using a cloud computing system.

(Hardware of Management Server)

Figure 2:
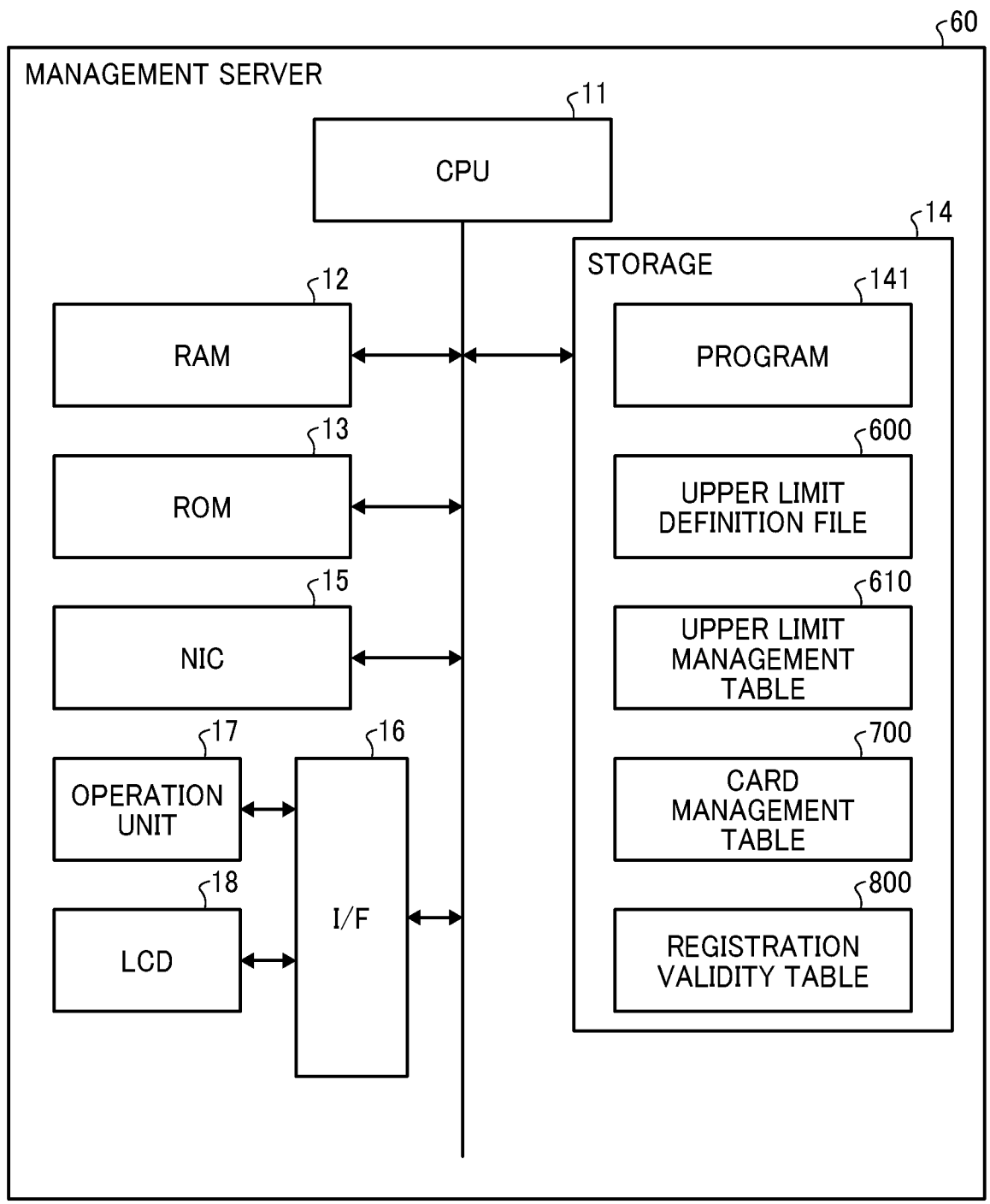
FIG. 2 illustrates an example of a hardware block diagram of a management server according to an embodiment of the present invention.

Hereinafter, a description is given of a hardware configuration of the server and the image forming apparatus included in the authentication management system 1. FIG. 2 illustrates an example of a hardware block diagram of the management server 60. As illustrated in FIG. 2, the management server 60 employs the same configuration of a general server, a PC, and the like.

As illustrated in FIG. 2, the management server 60 includes, for example, a central processing unit (CPU) 11, a random access memory (RAM) 12, a read only memory (ROM) 13, a storage 14, a network interface card (NIC) 15, and an interface (I/F) 16 connected with each other via a bus. Further, a liquid crystal display (LCD) 18 and an operation unit 17 are connected to the I/F 16.

The CPU 11 is a computing unit such as circuitry, and controls operations of the management server 60 entirely. The RAM 12 is a volatile storage device to which information can be read and written at a high speed, and is used as a working area when the CPU 11 processes information. The ROM 13 is a read-only non-volatile storage device that stores programs such as firmware and data. The storage 14 is a non-volatile storage device such as a hard disk drive (HDD), a solid state drive (SSD), and the like that stores information. The storage 14 stores operating system (OS), various control programs, application programs, data and the like.

In the embodiment, the storage 14 stores a program 141, an upper limit definition file 600, an upper limit management table 610, a card management table 700, and a registration validity table 800. The detail of each table and file is to be described later.

The I/F 16 connects the bus, the various hardware resources, and the network to control the bus, the various hardware resources, and the network. The LCD 18 is used as a visual user interface used for displaying various information, with which the administrator can check the status of the management server 60 by viewing the LCD 18. The operation unit 17 is a user operation interface such as a keyboard, a mouse, a hard button, a touch panel, and an operation panel used for inputting information to the management server 60 by the administrator. The NIC 15 is a unit used for controlling data communication with an external apparatus and a server. The NIC 15 controls data communication with the authentication server 40 disposed at each location via the network 100.

In this hardware configuration, one or more programs stored in the ROM 13, the program 141 stored in the storage 14, and/or one or more programs stored in a storage medium such as an optical disk are read and loaded on the RAM 12, and then executed by the CPU 11 to implement a software controller. When the hardware resources and the software controller are combined, a functional block to be described later is configured.

(Hardware of Authentication Server)

Figure 3:
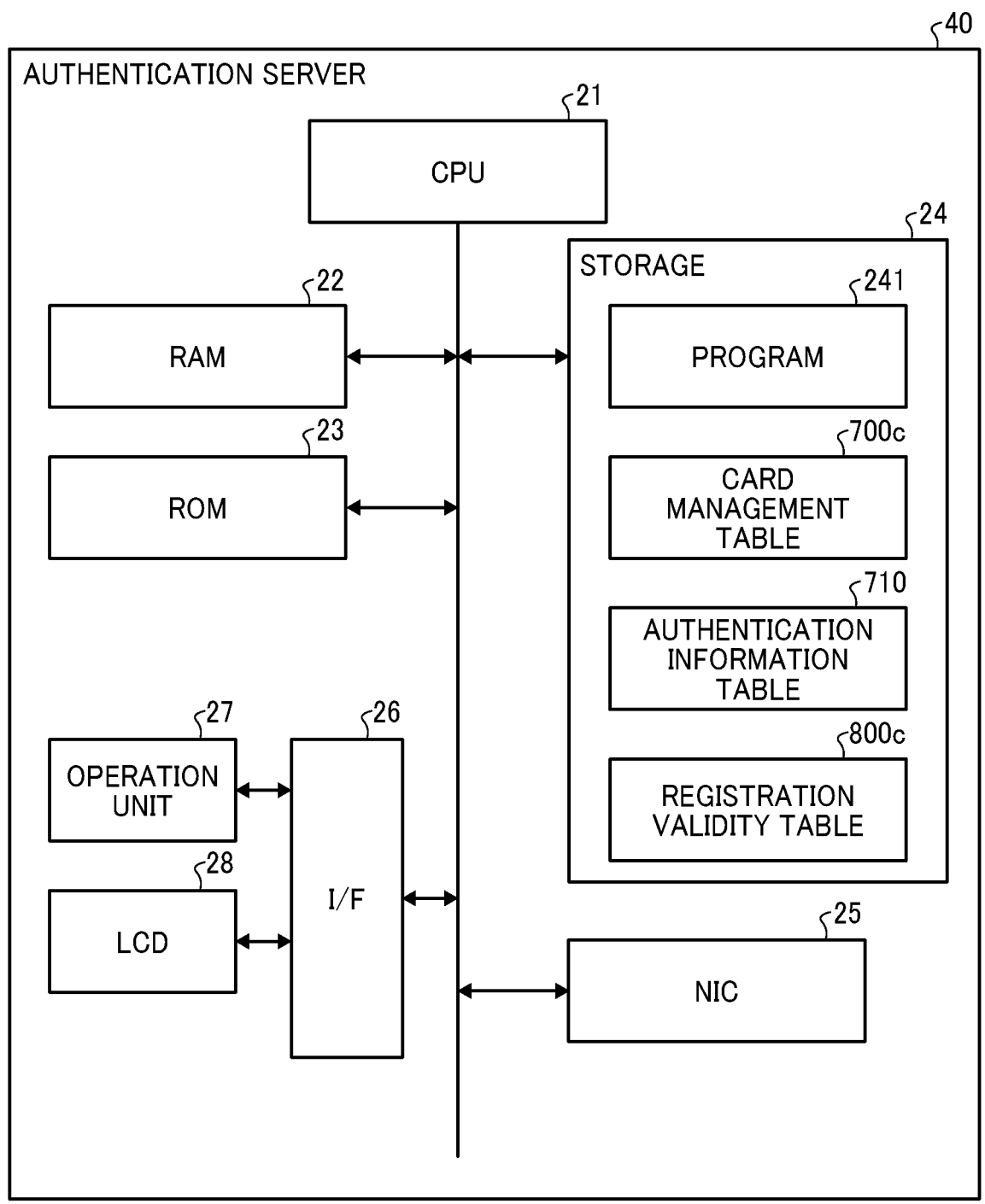
FIG. 3 illustrates an example of hardware block diagram of an authentication server according to an embodiment of the present invention.

FIG. 3 illustrates an example of a hardware block diagram of the authentication server 40. The authentication server 40 includes, for example a CPU 21, a RAM 22, a ROM 23, a storage 24, a NIC 25, and an I/F 26 connected with each other via a bus. Further, an LCD 28 and an operation unit 27 are connected to the I/F 26. The functions and operations of each of the hardware resources are same as those of the hardware resources of the management server 60 described above, so that the description of functions and operations of the each of the hardware resources of the authentication server 40 is omitted. The storage 24 stores a program 241, a card management table 700c, an authentication information table 710, and a registration validity table 800c. The detail of each table is to be described later.

In the embodiment, the card management table 700c and the registration validity table 800c, which are managed and stored by the authentication server 40 are used as cache data of the card management table 700 and the registration validity table 800 managed by the management server 60. For example, when a communication failure occurs between the management server 60 and the authentication server 40, the authentication server 40 can use the card management table 700c, the registration validity table 800c, and the authentication information table 710 stored and managed by the authentication server 40. Further, the card management table 700c stores one or more values of one or more users that are associated with the concerned authentication server 40 alone.

(Hardware of MFP)

Figure 4:
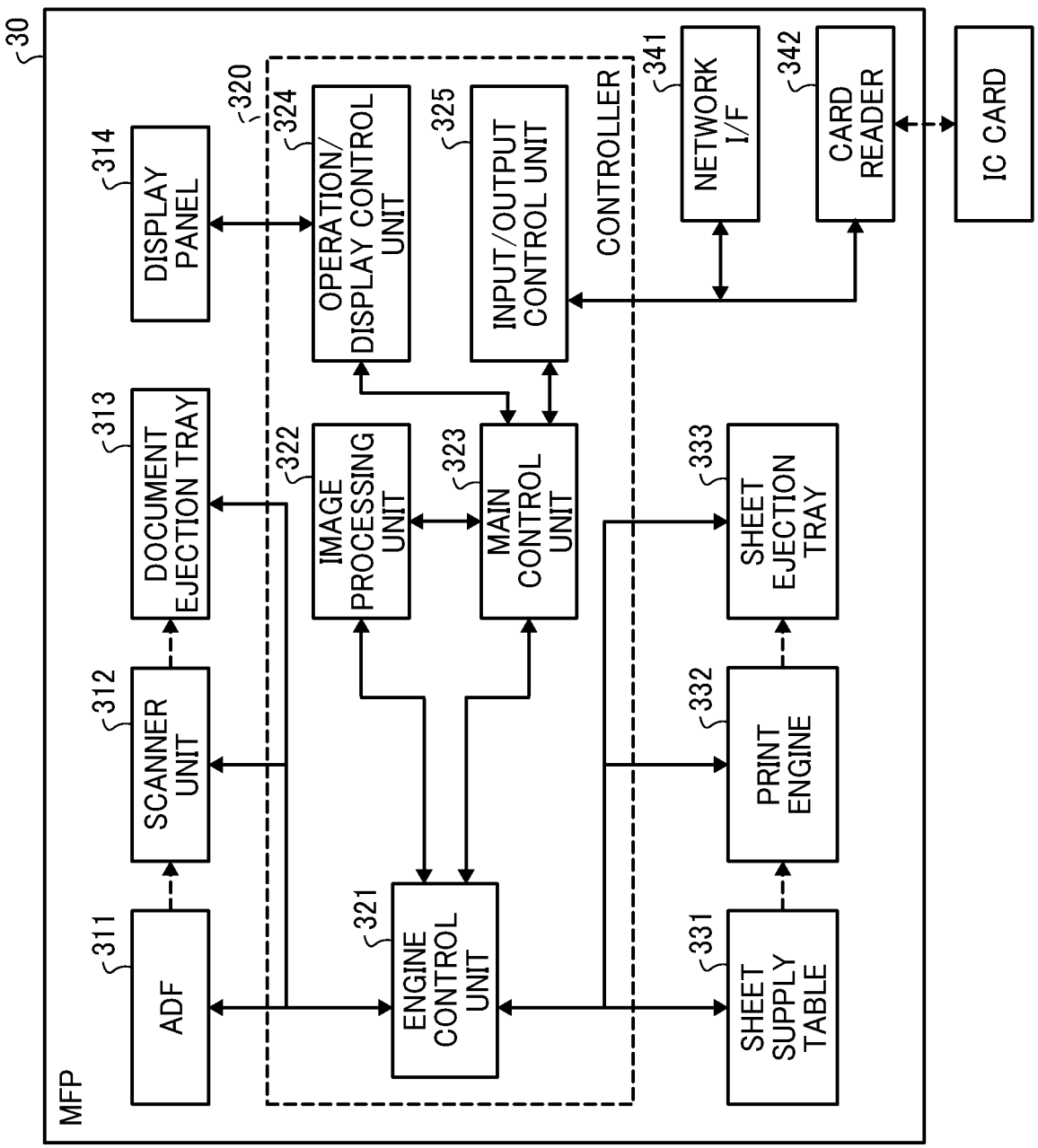
FIG. 4 illustrates an example of hardware block diagram of an image forming apparatus according to an embodiment of the present invention.

Hereinafter, a description is given of an internal configuration of the MFP 30. FIG. 4 illustrates an example of a hardware block diagram of the MFP 30. The MFP 30 includes, for example, a controller 320, an automatic document feeder (ADF) 311, a scanner unit 312, a document ejection tray 313, a display panel 314, a sheet supply table 331, a print engine 332, a sheet ejection tray 333, a network I/F 341, and a card reader 342. The controller 320 employs, for example, circuitry.

Further, the controller 320 includes, for example, a main control unit 323, an engine control unit 321, an input/output control unit 325, an image processing unit 322, and an operation/display control unit 324. As illustrated in FIG. 4, the MFP 30a is configured as a multifunctional apparatus having a scanner unit 312 and a print engine 332. In FIG. 4, an electrical connection is indicated by a solid arrow line, and a flow of sheet or sheet bundle is indicated by a dashed arrow line.

The display panel 314 is used as an output interface that visually displays a status of the MFP 30, and also as an input interface (operation unit) when a user directly operates display panel 314 as a touch panel, and when the user inputs information to the MFP 30. The network I/F 341 is used as an interface for the MFP 30 to communicate with the authentication server 40 and other apparatuses via the communication network 100. The network I/F 341 employs, for example, a NIC or a universal serial bus (USB) interface.

The card reader 342 performs non-contact communication with an IC card by using the radio frequency identification (RFID) technology to read information stored in the IC card. In the embodiment, the card reader 342 performs non-contact communication with the IC card owned by each user. When the user waves or places the IC card on over the card reader 342, the card reader 342 activates the IC card to read the card ID stored in the IC card.

The controller 320 can be configured by a combination of software and hardware resources. Specifically, the controller 320 is configured with a software controller implemented by the CPU that executes various programs, and hardware resources such as an integrated circuit. The programs to be executed by the CPU are, for example, stored in a non-volatile storage device such as the ROM or storage device, and loaded to the RAM from the non-volatile storage device. The controller 320 functions as a control unit that controls the MFP 30 entirely.

The main control unit 323 controls the respective units implemented in the controller 320, and transmits a command or instruction to each unit in the controller 320. The engine control unit 321 serves as a drive unit that controls or drives the print engine 332, the scanner unit 312, and the like. The input/output control unit 325 outputs a signal or an instruction, input via the network I/F 341 or the card reader 342, to the main control unit 323. Further, the main control unit 323 controls the input/output control unit 325 to access to other apparatuses via the network I/F 341 and the network.

The image processing unit 322 generates drawing information or rendering information based on to-be-printed image information under the control of the main control unit 323. The drawing information is information used for drawing an image to be formed by the print engine 332, which is an image forming unit, in the image forming operation. Further, the image processing unit 322 processes scanned image data input from the scanner unit 312 to generate image data. In this configuration, the generated image data is stored in the MFP 30 as a result of the scanning operation, or is transmitted to other apparatus via the network I/F 341. The operation/display control unit 324 displays information on the display panel 314, or the operation/display control unit 324 notifies information, input via the display panel 314, to the main control unit 323.

When the MFP 30 is operated as a printer, at first, the input/output control unit 325 receives a print job via the network I/F 341. Then, the input/output control unit 325 transfers the received print job to the main control unit 323. When the main control unit 323 starts to process the received print job, the main control unit 323 controls the image processing unit 322 to generate the drawing information based on document information or image information included in the print job.

After the image processing unit 322 generates the drawing information, the engine control unit 321 executes an image forming operation on a sheet conveyed from the sheet supply table 331 based on the generated drawing information. Specifically, the print engine 332 employs an image forming mechanism using an inkjet system or an image forming mechanism using an electrophotography system. After the print engine 332 forms an image on the sheet, the sheet is ejected to the sheet ejection tray 333.

When the MFP 30 is operated as a scanner, a scan execution instruction is input to the MFP 30 by a user by operating the display panel 314 or a scan execution instruction is input to the MFP 30 from an external apparatus, and then the operation/display control unit 324 or the input/output control unit 325 transmits a scan execution signal to the main control unit 323. After the main control unit 323 receives the scan execution signal, the main control unit 323 controls the engine control unit 321 based on the received scan execution signal. Then, the engine control unit 321 drives the ADF 311 to feed a target document set in the ADF 311 to the scanner unit 312.

Further, the engine control unit 321 drives the scanner unit 312 to scan the document fed from the ADF 311. Further, when the document is not set in the ADF 311 but the document is directly set on the scanner unit 312, the scanner unit 312 scans the set document under the control of the engine control unit 321. That is, the scanner unit 312 is operated as an image scanner.

In the scanning operation, an image capture element such as a charge coupled device (CCD) included in the scanner unit 312 optically scans the document to generate scanned information based on the optical information. The engine control unit 321 transfers the scanned information generated by the scanner unit 312 to the image processing unit 322. The image processing unit 322 generates image information based on the scanned information received from the engine control unit 321 under the control of the main control unit 323.

The image information generated by the image processing unit 322 is stored in a storage medium mounted to the MFP 30. The image information generated by the image processing unit 322 is stored in the storage medium in response to a user instruction, or the image information generated by the image processing unit 322 is transmitted to an external apparatus by the input/output control unit 325 via the network I/F 341.

Further, when the MFP 30 is operated as a copying machine, the image processing unit 322 generates the drawing information based on the scanned information received from the scanner unit 312 or the image information generated by the image processing unit 322. The engine control unit 321 drives the print engine 332 based on the drawing information in the same manner as in the case of the printing operation.

(Functional of Management Server)

Figure 5:
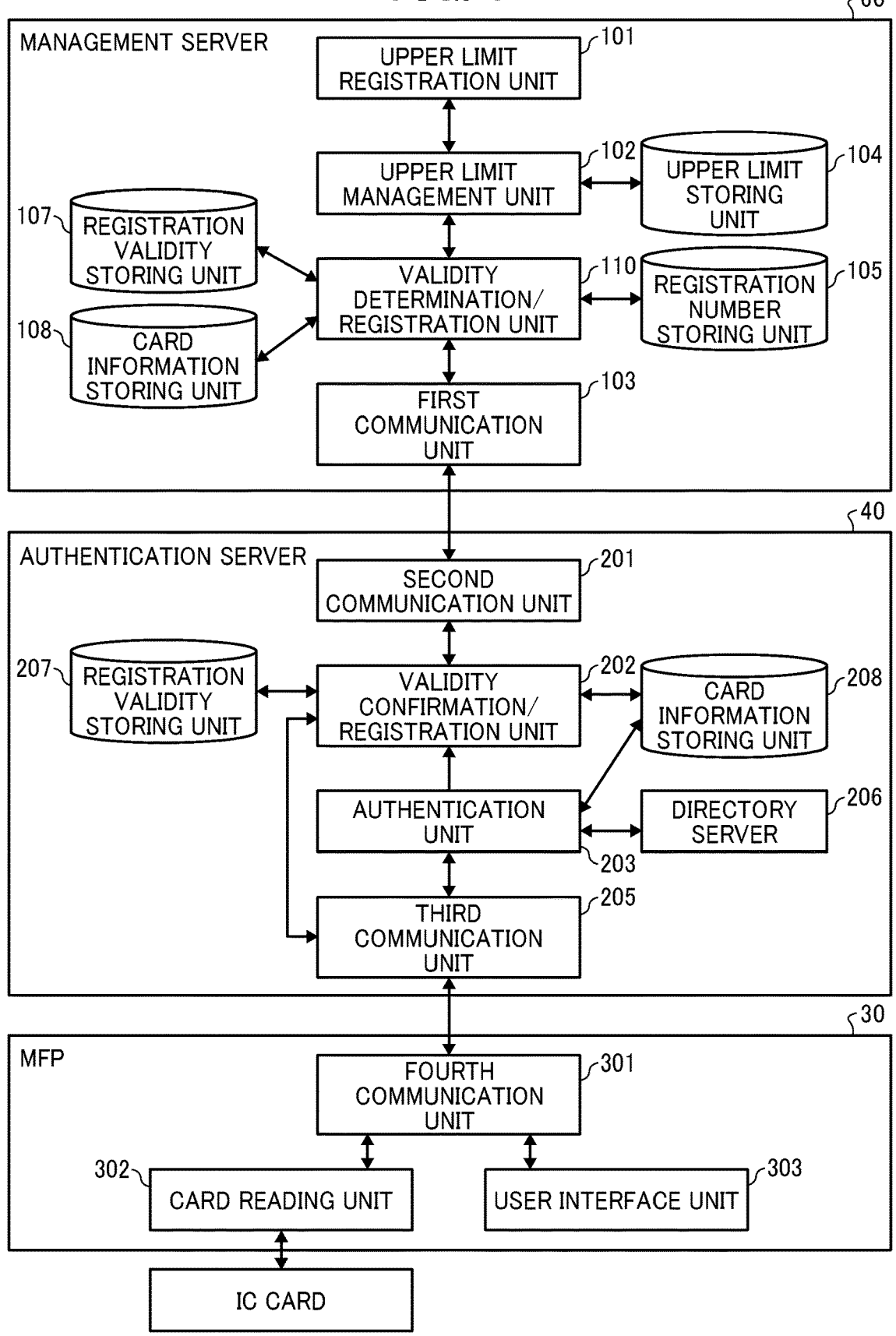
FIG. 5 illustrates an example of a functional block diagram of the authentication management system of FIG. 1.

Hereinafter, a description is given of an example of a functional configuration of each apparatus configuring the authentication management system 1 with reference to FIG. 5. As illustrated in FIG. 5, the management server 60 includes, for example, an upper limit registration unit 101, an upper limit management unit 102, a validity determination/registration unit 110, a first communication unit 103, an upper limit storing unit 104, a registration number storing unit 105, a registration validity storing unit 107, and a card information storing unit 108.

The upper limit registration unit 101 sets an upper limit of the number of IC cards that can be registered for each user in the system by using a management tool used by an administrator. When the upper limit of the number of IC cards is set by the upper limit registration unit 101, the upper limit management unit 102 updates the value of the upper limit stored in the upper limit storing unit 104.

The validity determination/registration unit 110 updates information stored in the registration number storing unit 105. The validity determination/registration unit 110 stores the card ID and the user name as one set data in the card information storing unit 108. The validity determination/registration unit 110 stores registration validity information, to be described later with FIG. 8, in the registration validity storing unit 107, and determines whether the registration of a new card is allowed for a concerned user based on the data stored in the registration validity storing unit 107. When the validity determination/registration unit 110 determines whether the registration of the new card for the concerned user is allowed, and then the validity determination/registration unit 110 determines that the registration of the new card is allowed for the concerned user, the validity determination/registration unit 110 returns a confirmation or check result to the authentication server 40 that has requested the registration permission of the IC card to the management server 60.

The first communication unit 103 is used for communicating data with the authentication server 40.

The upper limit storing unit 104 stores information of the upper limit definition file 600 illustrated in FIG. 2 (to be described later with FIG. 6A), and the registration number storing unit 105 stores information of the upper limit management table 610 (to be described later with FIG. 6B).

The registration validity storing unit 107 stores information of the registration validity table 800 (to be described later with FIG. 8) illustrated in FIG. 2.

The card information storing unit 108 stores the card management table 700 (to be described later with FIG. 7A) illustrated in FIG. 2.

As to the management server 60 used as the management apparatus having the above configuration, the validity determination/registration unit 110 is used as a determination unit and a registration unit in the management server 60. The upper limit registration unit 101 configures an operation display unit, which can be implemented by the operation unit 17 such as an operation panel. The card information storing unit 108 configures a second storage unit, which can be implemented by a memory.

As illustrated in FIG. 5, the authentication server 40 includes, for example, a second communication unit 201, a validity confirmation/registration unit 202, an authentication unit 203, a third communication unit 205, a directory server 206, a registration validity storing unit 207, and a card information storing unit 208.

The second communication unit 201 is used for communicating data with the management server 60.

The validity confirmation/registration unit 202 stores the card ID and the user name as one set data in the card information storing unit 208. The validity confirmation/registration unit 202 stores the registration validity information (to be described later with FIG. 8) in the registration validity storing unit 207. When communication between the authentication server 40 and the management server 60 is failed, the validity confirmation/registration unit 202 determines whether the registration of a new card can be performed based on data stored in the registration validity storing unit 207. The registration validity information corresponds to information used for confirming whether or not the authentication information can be added and registered. Based on the registration validity information, it can be determined whether an additional registration of authentication information of the concerned user is allowed or not.

The authentication unit 203 determines whether the MFP 30, disposed at the same location of the authentication server 40, can be used by a user based on the information stored in the directory server 206 or the card information storing unit 208, in which the authentication in response to a request for use (user-initiated authentication) is performed. As to the authentication server 40, the authentication unit 203 determines whether the MFP 30, disposed at the same location of the authentication server 40, can be used by the concerned user. When one IC card is to be newly registered, the authentication unit 203 performs the authentication processing for the user.

The third communication unit 205 is used for communicating data with the MFP 30 disposed at the same location of the authentication server 40.

The directory server 206 registers and retrieves (or searches) attribute information such as a user ID and a password of each user. The directory server 206 stores and manages information of the authentication information table 710 (to be described later with FIG. 7) illustrated in FIG. 3. Further, the directory server 206 may have a function of storing attribute values of each of the apparatuses such as identification information of the management server 60, and identification information of the MFP 30 disposed at the same location of the authentication server 40, and may have a function of retrieving or searching these information. Further, the directory server 206 can be replaced by software that provides conventional directory service.

The registration validity storing unit 207 stores information of the registration validity table 800c (to be described later with FIG. 8) illustrated in FIG. 3.

The card information storing unit 208 stores the card management table 700c (to be described later with FIG. 7A) illustrated in FIG. 3. The information stored in the card information storing unit 208 is data related to one or more users belonging to the authentication server 40 alone. Similarly, in a case of the authentication server 40b, the information stored in the card information storing unit 208 is data related to one or more users belonging to the authentication server 40b alone.

As to the authentication server 40 having the above configuration, the validity confirmation/registration unit 202 is used as a confirmation unit. The card information storing unit 208 is used as a first storage unit.

As illustrated in FIG. 5, the MFP 30 includes, for example, an fourth communication unit 301, a card reading unit 302, and a user interface unit 303. The fourth communication unit 301 is used for communicating data with the authentication server 40. The card reading unit 302 reads information stored in the IC card. The user interface unit 303 displays a message for a user using the MFP 30, and receives the input from the user.

Hereinafter, a description is given of examples of data used in the embodiment with reference to FIGS. 6 to 8. FIG. 6 illustrates an example of data stored and managed by the management server 60. FIG. 6A illustrates an example of the upper limit definition file 600. The upper limit definition file 600 is a file storing a value of the upper limit of number of cards (i.e., upper limit value) that can be registered for one single user throughout the entire system. When the registrable upper limit is set to "three (3)" in the upper limit definition file 600, the upper limit of number of cards that can be registered for one single user is set "three (3)" throughout the entire system including entire domains such as the first domain AD and the second domain BD (see FIG. 1). The registrable upper limit, set in the upper limit definition file 600, can be set and updated by an administrator of the system.

FIG. 6B illustrates an example of the upper limit management table 610. In the upper limit management table 610, a user name column 611 and a registration number column 612 are associated with each other. The user name column 611 stores data that combines a user name and a domain name where the user belongs by using a sign of @. The registration number column 612 stores the number of cards currently registered for each user in each domain. In an example case of FIG. 6B, a user having a user name of "aaa" registers two cards in the first domain AD, and registers one card in the second domain BD. Further, another user having a user name of "bbb" registers one card in the first domain AD but does not register any card in the second domain BD.

FIG. 7A illustrates an example of the card management table 700 stored and managed by the management server 60. The card management table 700 stores the user information and the card information while each of the authentication server 40 disposed at each location (e.g., authentication servers 40a, 40b) stores the user information and the card information, stored in the card management table 700 in the management server 60, as cache information in the authentication server 40. For example, the authentication server 40a located at the first location A stores the cache information related to the authentication server 40a alone, and the authentication server 40b located at the second location B stores the cache information related to the authentication server 40b alone.

The card management table 700 includes a card ID column 701 and a user name column 702 that are associated with each other. The card ID column 701 stores identification information of the IC card (i.e., card ID). The user name column 702 stores user identification (ID) of a user who owns the concerned IC card. In an example case of FIG. 7A, a user having a user name of "aaa" owns three IC cards having card IDs of "0001, 0002, and 0004" while another user having a user name of "bbb" owns one card having an card ID of "0003."

FIG. 7B illustrates an example of the authentication information table 710. In the authentication information table 710 managed and stored by the authentication server 40, a user name column 711 and a password column 712 are associated with each other. The password column 712 stores a password set for each user, but not limited thereto. For example, instead of the password, the password column 712 can store a hash value prepared from the password. By using the tables of FIGS. 7A and 7B, the card ID and the password can be linked or associated with each other via the user name.

FIG. 8 illustrates an example of the registration validity table 800 stored and managed by the management server 60. The registration validity table 800 stores the user information and registration validity information while each of the authentication server 40 disposed at each location (e.g., authentication servers 40a, 40b) stores the user information and registration validity information stored in registration validity table 800 of the management server 60 as cache information in the authentication server 40. For example, the authentication server 40a located at the first location A stores the cache information related to the authentication server 40a alone, and the authentication server 40b located at the second location B stores the cache information related to the authentication server 40b alone.

The registration validity table 800 includes a user name column 801 and a registration validity column 802 that are associated with each other. The registration validity table 800 is used for determining whether a user can register a new IC card. In an example case of FIG. 8, a user having a user name of "aaa" cannot register a new IC card (i.e., not valid) while another user having a user name of "bbb" can register a new IC card (i.e., valid).

When the registration number illustrated in FIG. 6B becomes the upper limit illustrated in FIG. 6A, the management server 60 determines that the new card registration is not allowed for the concerned user who has reached the upper limit, and set "NO" in the registration validity column 802 for the concerned user. When the registration validity column 802 is changed from "YES" to "NO," the authentication management system 1 does not allow the new card registration for the concerned user.

Figure 9:
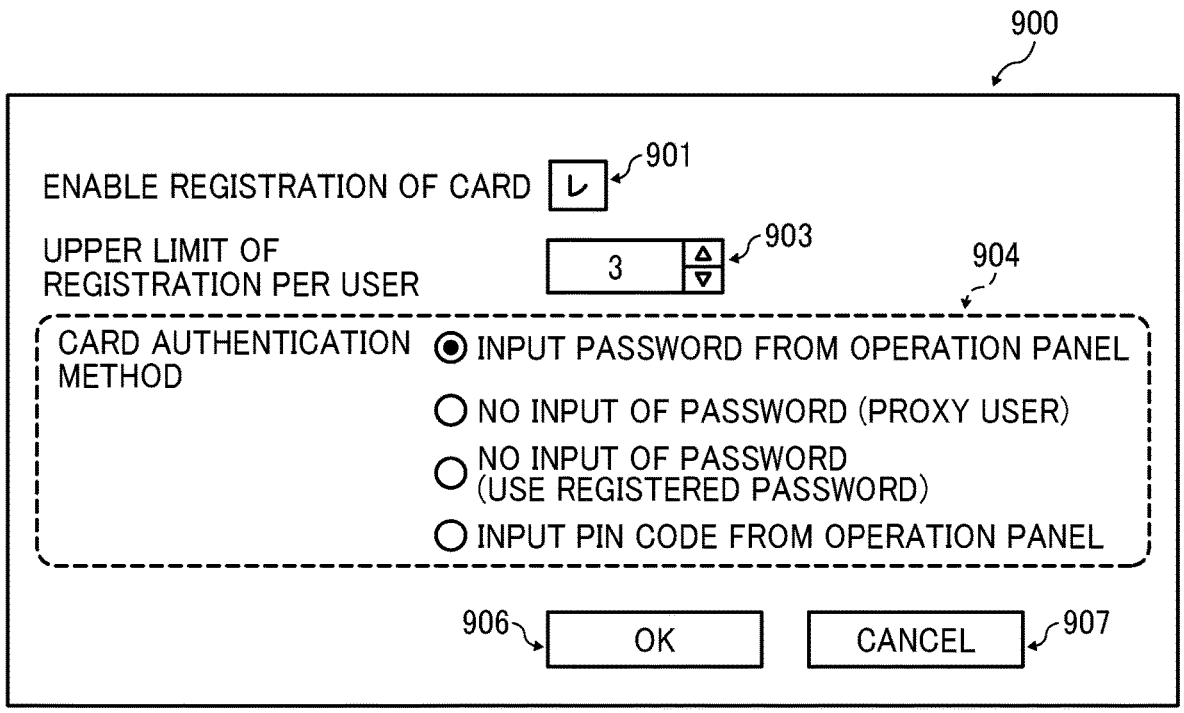
FIG. 9 illustrates an example of a setting screen when registering a card upper limit according to an embodiment of the present invention.

FIG. 9 illustrates an example of a screen for setting the upper limit of the registrable card. The screen illustrated in FIG. 9 is an example of a setting screen 900 displayed by the upper limit registration unit 101 of the management server 60. The setting screen 900 can be used for registering the upper limit of the IC card, and other information such as setting an authentication method used for the registration of IC card.

When a check mark is set in a check box 901 as illustrated in FIG. 9, the IC card can be registered at the MFP 30. The upper limit setting column 903 is used to set the upper limit of the number of IC cards that can be registered for each user (i.e., the maximum number of IC cards that can be registered for each user).

The "input password from operation panel" set in the setting screen 900 assumes a case when a user given with an IC card is to perform a new registration of card via the MFP 30. That is, the "input password from operation panel" is a mode to determine whether the user is a legitimate user, in which when a password that only the legitimate user can know is input, the MFP 30 determines that the user is the legitimate user. When a radio button set for the "input password from operation" is marked as illustrated in FIG. 9, the MFP 30 displays a screen for inputting the user name and password after reading the IC card (see FIG. 10).

Further, the "input without a password" (proxy user)" set in the setting screen 900 assumes a case when an administrator registers an IC card for a user at the MFP 30. In this case, the MFP 30 displays a column for inputting the user name alone after reading the IC card.

Further, the "no input of password (use registered password)" set in the setting screen 900 assumes a case when a card-owner user is to register himself or herself, and the input of password is not requested when registering the IC card. In this case, the MFP 30 displays a column for inputting the user name alone after reading the IC card.

Further, the "input PIN code from operation panel" set in the setting screen 900 assumes a case that inputting a PIN code instead of the password. The PIN code may be a code determined by a user or an administrator in advance, or may be a code that varies over time (one-time code).

When an OK button 906 on the setting screen 900 is pressed, the value of the upper limit definition file 600 is updated to a value specified in the upper limit setting column 903. By contrast, when a cancel button 907 on the setting screen 900 is pressed, the setting operation is canceled, and the value set currently in the upper limit definition file 600 is maintained without updating.

Figure 10:
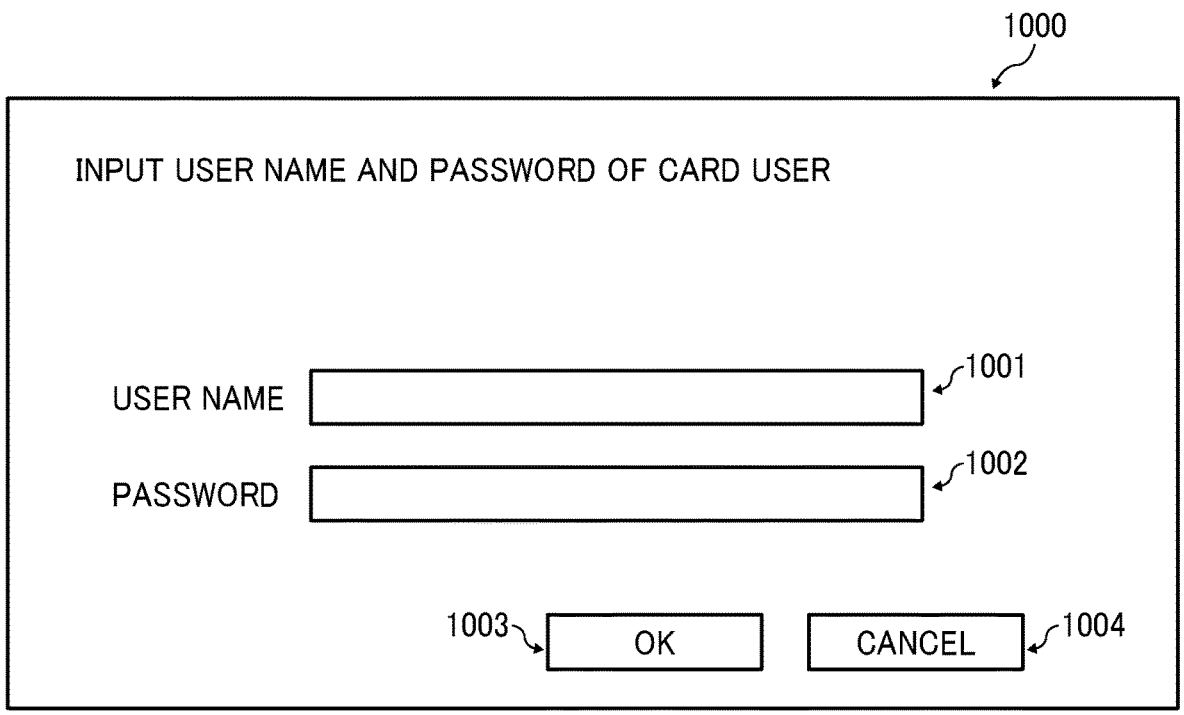
FIG. 10 illustrates an example of an authentication screen when registering a card according to an embodiment of the present invention.

FIG. 10 illustrates an example of an authentication screen displayed on the MFP 30 when registering an IC card. When the card reading unit 302 of the MFP 30 reads a card ID stored in the IC card, the user interface unit 303 displays an authentication screen 1000 illustrated in FIG. 10. Then, a user inputs his or her name in a user name field 1001, and his or her password in a password field 1002, and then presses an OK button 1003. Then, the MFP 30 transmits the read card ID and the input user name and password to the authentication server 40. When the authentication of the transmitted card ID is verified in the authentication server 40, and the number of registered cards has not yet reached the upper limit, a new IC card is registered in the card management table 700 illustrated in FIG. 7A, with which the new IC card can be used at the MFP 30. By contrast, when a cancel button 1004 is pressed, the previously performed operation is canceled, and the new IC card is not registered.

(Authentication Management Method)

Figure 11:
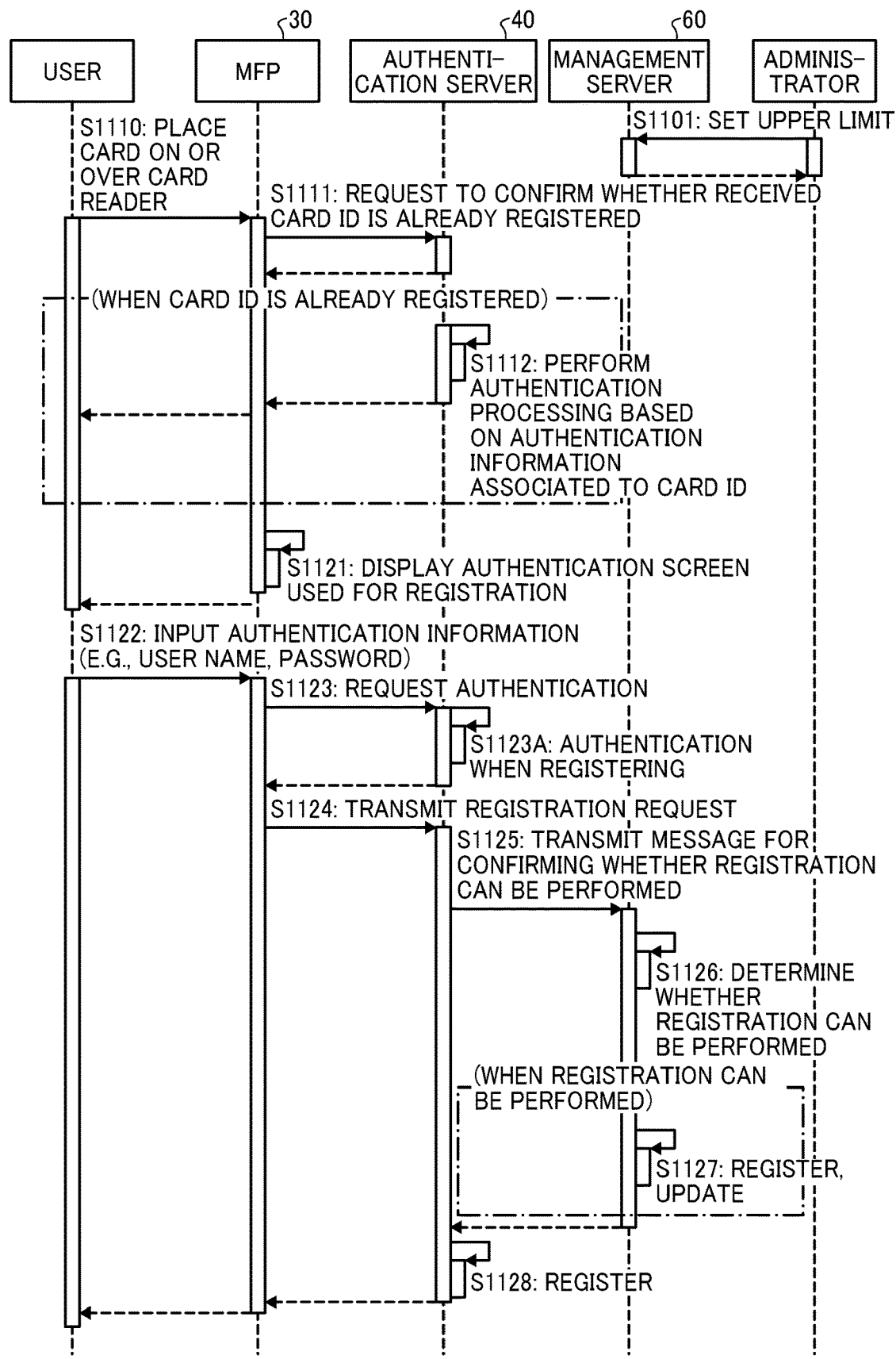
FIG. 11 illustrates an example of a sequence diagram of an operation of the authentication management system of FIG. 5.
Figure 12:
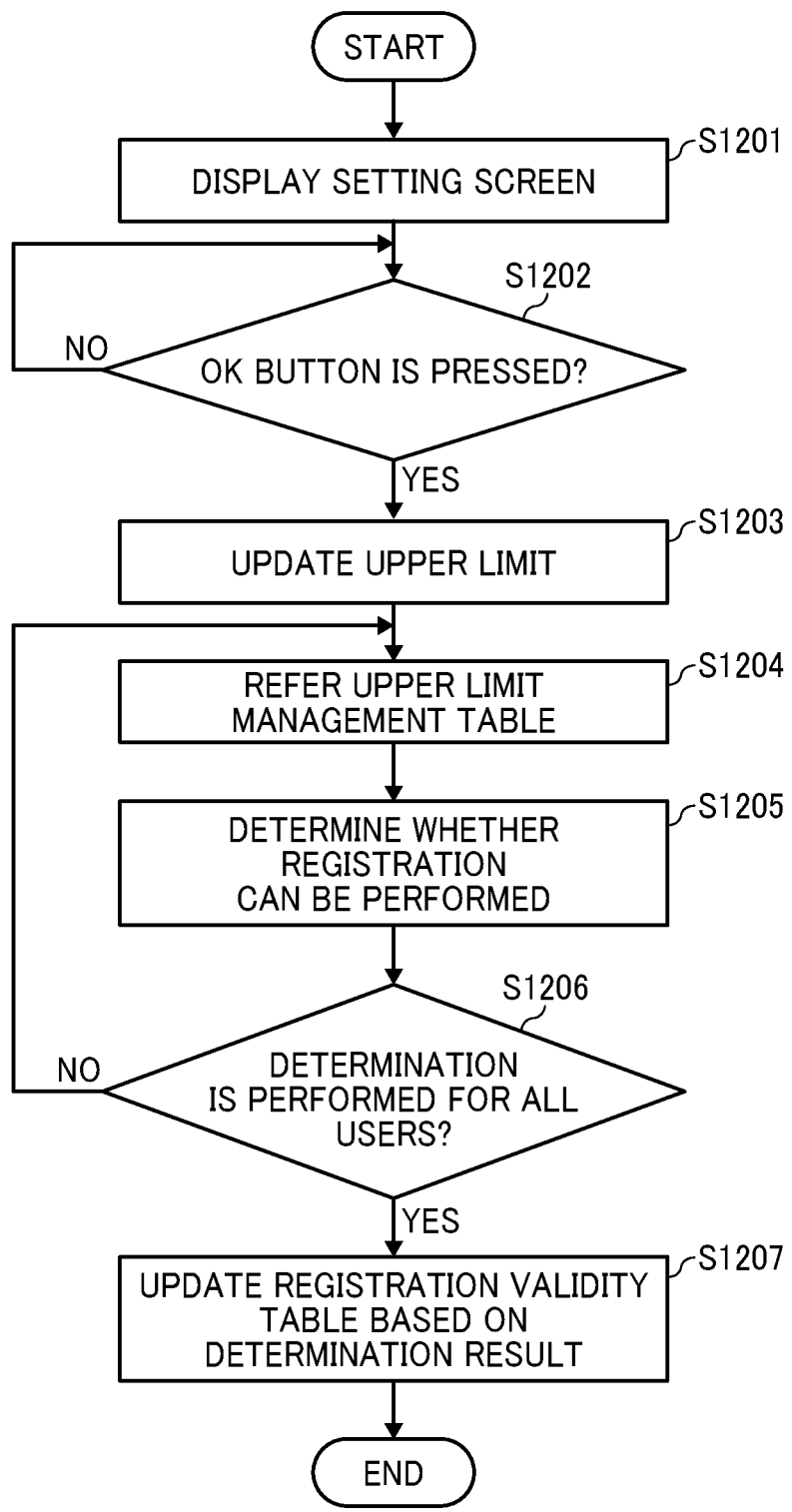
FIG. 12 illustrates an example of a flowchart of the steps of setting an upper limit of the number of cards that can be registered per person according to an embodiment of the present invention.

Hereinafter, a description is given of an operation of the embodiment with reference to FIGS. 11 and 12. FIG. 11 illustrates an example of a sequence diagram of an operation of the authentication management system 1, and FIG. 12 illustrates an example of a flowchart of the steps of setting an upper limit of the number of cards that can be registered per person.

In the authentication management system 1, the management server 60 sets an upper limit of the number of IC cards that can be registered per person (S1101). Hereinafter, a detail of step 1101 is described later with reference to the flowchart of FIG. 12. As illustrated in FIG. 12, the upper limit registration unit 101 of the management server 60 displays the setting screen 900 when the administrator performs a given operation (S1201). Then, the administrator inputs a setting value to the upper limit setting column 903 set on the setting screen 900 (see FIG. 11).

The upper limit registration unit 101 receives an input of a value of the upper limit, and checks whether the OK button 906 is pressed (S1202: YES/NO), which is a loop process. When the OK button 906 is pressed (S1202: YES), the upper limit registration unit 101 transfers the value set in the upper limit setting column 903 to the upper limit management unit 102.

Then, the upper limit management unit 102 of the management server 60 updates the value of the upper limit stored in the upper limit storing unit 104 to the value transferred from the upper limit registration unit 101 (S1203). Then, the upper limit management unit 102 transfers the updated upper limit to the validity determination/registration unit 110.

Then, the validity determination/registration unit 110 refers to the upper limit management table 610 stored in the registration number storing unit 105, and calculates the total number of cards registered for each user name (S1204). For example, in an example illustrated in FIG. 6B, the total number of cards registered for the user name of "aaa" can be obtained as a value of "3" based on two cards registered in the first domain AD and one card registered in the second domain BD. Further, the total number of cards registered for the user name of "bbb" can be obtained as a value of "1" based on one card registered in the first domain AD and no card registered in the second domain BD.

The validity determination/registration unit 110 compares the updated upper limit and the total number of the registered cards for each user name, and determines whether the user can further register a new card (S1205). When the total number of registered cards is equal to or greater than the upper limit, the validity determination/registration unit 110 temporarily stores a validity flag value indicating "NO (i.e., no further registration is allowed)" in association with the user name, and when the total number of registered cards is less than the upper limit, the validity determination/registration unit 110 temporarily stores a validity flag value indicating "YES (i.e., registration is allowed)" in association with the user name.

Then, the validity determination/registration unit 110 determines whether the processing of steps S1204 and S1205 is performed for all users (S1206). If one or more users are not yet processed for steps S1204 and S1205 (step S1206: NO), the sequence returns to step S1204.

On the other hand, when the processing of steps S1204 and S1205 is performed for all of the users (S1206: YES), the validity determination/registration unit 110 updates the registration validity column 802 of the registration validity table 800 from "YES" to "NO" or from "NO" to "YES" for each user name based on the temporarily stored validity flag value (S1207). Further, the validity determination/registration unit 110 transmits one data set of the user name and the validity flag value to each of the authentication servers 40a and 40b via the first communication unit 103.

Then, the validity confirmation/registration unit 202 of the authentication server 40a acquires the data set (e.g., user name, validity flag) via the second communication unit 201. Then, the validity confirmation/registration unit 202 of the authentication server 40a updates the registration validity column 802 of the registration validity table 800 from "YES" to "NO" or from "NO" to "YES" for each user name based on the validity flag value (S1207). Further, the authentication server 40b also performs the similar processing.

Referring back to the sequence diagram illustrated in FIG. 11, a description is given of an example of the operation of the authentication management system 1 when performing the authentication in response to a request for use (user-initiated authentication) and registering a new IC card. In the embodiment, it is assumed that the mode of "input password from operation panel" described with reference to FIG. 9 is in an enabled status.

First, a user places or waves an IC card on or over the card reader 342 of the MFP 30a (S1110). Then, the card reading unit 302 of the MFP 30a reads a card ID stored in the IC card, and transmits the read card ID to the authentication server 40a (S1111). The authentication unit 203 of the authentication server 40a searches data in the card information storing unit 208 to check or confirm whether the received card ID is already registered or not in the authentication server 40a.

If the received card ID is already registered in the authentication server 40a, the authentication unit 203 inquires the directory server 206 by using the user name as a search key, and performs the authentication processing of the user (S1112). Then, the authentication unit 203 acquires an access right of the user from the directory server 206, and returns the authentication result and information of the access right to the MFP 30a. With this processing, the MFP 30a provides functions such as copying and printing to the user who has waved or placed the IC card on or over the card reader 342 of the MFP 30a.

On the other hand, if the received card ID is not yet registered in the authentication server 40a, the authentication unit 203 transmits a message indicating "card ID is not yet registered" to the MFP 30a. Then, the user interface unit 303 of the MFP 30a displays the authentication screen 1000 illustrated in FIG. 10, and waits an input of a user name and a password (S1121).

When the user inputs the user name and the password (S1122), the fourth communication unit 301 of the MFP 30a transmits the authentication request message to the authentication server 40a together with the user name, the password, and the read card ID as one data set (S1123).

After the third communication unit 205 of the authentication server 40a receives the data used for authentication processing (e.g., one data set of user name, password, and card ID), the third communication unit 205 transfers the data used for authentication processing to the authentication unit 203. Then, the authentication unit 203 inquires the user name and the password to the directory server 206 to determine whether the user name input in S1122 is registered in the authentication information table 710, and whether the password input in S1122 matches the password registered in the authentication information table 710 (step S1123A) to perform the authentication at the timing of registering a new IC card. Then, the authentication unit 203 returns the obtained authentication result to the MFP 30a.

If the authentication at the timing of registering the new IC card is verified (i.e., the user name and password input in S1122 match the user name and password registered in the authentication information table 710 of the directory server 206), the fourth communication unit 301 of the MFP 30a transmits the registration request message to the authentication server 40a (S1124).

Then, the validity confirmation/registration unit 202 of the authentication server 40a transmits a message for confirming whether the registration can be performed to the management server 60 together with the user name and the card ID obtained by the above processing (S1125).

Then, the validity determination/registration unit 110 of the management server 60 refers to the registration validity table 800 stored in the registration validity storing unit 107, and determines whether the new IC card can be registered for the user (S1126). In this process, it is determined whether the number of cards owned by the user has reached the upper limit. When the number of cards owned by the user has already reached the upper limit, a message indicating that the number of cards owned by the user has reached the upper limit is transmitted to the MFP 30a, and then the MFP 30a displays a message that the number of cards registered for the user has already reached the upper limit to inform the user. Then, the sequence ends without registering the new IC card.

If the new card can be registered for the user, the validity determination/registration unit 110 of the management server 60 performs the following registration/updating processing (S1127). The processing in step S1127 includes a plurality of variations. In the embodiment, it is assumed that any one of the following variations can be performed in S1127.

For example, the validity determination/registration unit 110 newly adds one data set of the user name and the card ID to the card management table 700 stored in the card information storing unit 108.

Further, the validity determination/registration unit 110 increases the number of cards registered for the concerned user by one, and updates the value in the registration number column 612 of the upper limit management table 610.

Further, the validity determination/registration unit 110 determines whether the number of cards registered for the concerned user has reached the upper limit. When the number of cards registered for the concerned user has reached the upper limit, the validity determination/registration unit 110 updates the value of the registration validity column 802 of the registration validity table 800 from "YES" to "NO." When the validity determination/registration unit 110 determines that the number of cards registered for the concerned user has reached the upper limit, the validity determination/registration unit 110 transmits one data set of the user name and the validity flag indicating "NO (i.e., no further registration is not allowed)" to the authentication server 40a.

When the authentication server 40a receives a determination result indicating that the new card registration is allowed, the validity confirmation/registration unit 202 newly registers the set of the user name and the card ID in the card management table 700c stored in the card information storing unit 208 (S1128). Then, the validity confirmation/registration unit 202 transmits a message indicating that the new card registration is performed to the MFP 30a, and then the user interface unit 303 of the MFP 30a notifies the message indicating that the new card is registered to the user. On the other hand, when the authentication server 40*a* receives one data set of the user name and the validity flag indicating the value of "NO (i.e., no further registration is allowed)," the authentication server 40*a* updates the value of the registration validity column 802 of the registration validity table 800 from "YES" to "NO."

In the above described embodiment, it is assumed that the management server 60 determines whether the registration can be performed based on the value stored in the registration validity table 800 illustrated in FIG. 8. As illustrated in FIG. 8, the registration validity table 800 sets the value of "YES (i.e., registration is allowed) and the value of "NO (i.e., no further registration is allowed)" based on the comparison result of the registration number stored in the registration number column 612 of the upper limit management table 610 (FIG. 6B) and the upper limit set in the upper limit definition file 600 (FIG. 6A). Therefore, it can be assumed that the management server 60 determines whether the registration can be performed based on the upper limit management table 610.

Further, the management server 60 can be configured to directly use the values stored in the upper limit management table 610 without referencing the registration validity table 800 to determine whether the registration can be performed. In this configuration, in step S126 of FIG. 11, the management server 60 compares the registration number stored and managed in the registration number column 612 of the upper limit management table 610 (FIG. 6B) and the upper limit set in the upper limit definition file 600 (FIG. 6A) to determine whether the new card can be registered for the user who is currently requesting the new card registration.

In the above described embodiment, two domains such as the first domain AD and the second domain BD are set, and one authentication server and two image forming apparatuses are disposed in each domain, but the number of domains, the number of authentication servers, and the number of image forming apparatuses are not limited thereto. Further, the number of management servers (i.e., core servers) is not limited to the above described embodiment.

In the above described embodiment, it is assumed that one domain is set for one location or one workplace, but the scope, size and area of the domains are not limited thereto.

In the above described embodiment, a case that the authentication is performed when a user logs into the image forming apparatus such as MFP 30 is described, but the authentication processing by the authentication server 40 is not limited to the case of login to the image forming apparatus. For example, various apparatuses used in offices such as workplace terminals (e.g., client terminals), projectors interactive electronic boards, TV conference systems and the like can be used as the target of the authentication processing. That is, the MFP 30 is an example of apparatuses used by employees in the offices, and the office equipment that requires the authentication processing when the employees use the office equipment becomes the target of the authentication processing by the authentication server 40. The office equipment is not limited to the equipment installed in the offices, but includes apparatuses that an employer allows employees to use for conducting business operations. Further, the apparatuses are not limited to the office equipment, but can be any machines that are used by users.

In the above described embodiment, the IC card is used for the authentication processing, but the medium used for the authentication processing is not limited to the IC card. For example, a portable apparatus such as a mobile terminal carried by a user can be used as a medium used for the authentication processing. Further, biometric information can be used for the authentication processing to implement the above described system. The biometric information not detachable from the user may have some complexity of management for both of the user and the administrator. A physical medium or device detachable from the user can be managed easily by both of the user and the administrator to attain the above described effect of the system.

Therefore, the authentication information is not be limited to the card ID. The authentication server 40 stores and manages authentication information of user such as the card ID used for authenticating each user, and the authentication information managed by the plurality of authentication servers 40 disposed at different domains is collected and managed by the management server 60 for each user in the entire system.

As to the above described configuration of the embodiment, the upper limit of the number of registrable IC cards and the registration validity check of IC cards can be controlled integrally. Specifically, the upper limit of the number of IC cards that can be registered for one user in the entire system can be set, and the upper limit of the number of IC cards used or owned by one user in the entire system can be integrally managed. With this configuration, the complexity of managing the IC cards of each user can be reduced, and the number of missing cards can be reduced.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

As described above, the present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:

1. An authentication management system comprising:
a plurality of authentication apparatuses disposed at different locations, each of the authentication apparatuses being configured to perform authentication processing on each user who requests to use a machine; and a management apparatus connectable to the plurality of authentication apparatuses via a network, configured to store and manage authentication information of each user registered in each of the plurality of the authentication apparatuses, wherein each of the plurality of authentication apparatuses includes a first memory to store the authentication information including one or more identification information of each user, the authentication information is used for authenticating each user when each user is to use the machine, and first circuitry to receive a request for determining whether a user at the machine is authenticated to use the machine, in response to receiving authentication information input by the user via the machine, perform the authentication processing on the received authentication information of the user, and transmit, to the management apparatus, a request for determining whether to allow an additional registration of the received authentication information of the user that is not yet stored in the first memory, wherein the management apparatus includes a second memory to store authentication information including one or more identification information of each user, the authentication information is used for authenticating each user when each user is to use the machine, and second circuitry to in response to receiving the request for determining whether to allow the additional registration of the user from the authentication apparatus, determine whether the additional registration of the received authentication information of the user is allowed based on the number of authentication information of the user already stored in the second memory, transmit a determination result indicating whether the additional registration of the received authentication information of the user is allowed or not allowed to the authentication apparatus, and register the authentication information of the user additionally in the second memory when the determination result indicates that the additional registration of the received authentication information of the user is allowed, wherein the second memory stores an upper limit of the number of media ownable by each user, each medium to be used for authenticating the user who requests to use the machine, and the number of media already owned by the user, wherein when the second circuitry acquires the authentication information of the user from one additional medium owned by the user, the second circuitry compares the upper limit of the number of media ownable by the user and the number of media already owned by the user stored in the second memory to determine whether the additional registration of the authentication information of the user, requested by using the one additional medium, is allowed in the authentication management system, wherein the second circuitry of the management apparatus sends the number of authentication information of the user, stored in the second memory, to the authentication apparatus, and wherein when the management apparatus does not return a reply to the authentication apparatus in response to the request for determining whether to allow the additional registration, the first circuitry of the authentication apparatus determines whether the additional registration of the authentication information of the user is allowed based on the number of authentication information of the user stored in the authentication apparatus.

2. The authentication management system of claim 1, wherein the management apparatus further includes an operation interface used for setting the upper limit of the number of the media ownable by each user, wherein when the upper limit is set via the operation interface, the second circuitry compares the set upper limit and the number of the media currently owned by the user, stored in the second memory, to determine whether the number of the media currently owned by the user is less than the set upper limit, or equal to or greater than the set upper limit.

3. The authentication management system of claim 2, wherein the second memory stores registration validity information determined for each user based on a comparison of the set upper limit and the number of the media currently owned by the user, wherein when the second circuitry receives the request for determining whether to allow the additional registration from the authentication apparatus, the second circuitry determines whether the additional registration of the authentication information of the user is allowed based on the registration validity information of each user stored in the second memory.

4. A management apparatus connectable with a plurality of authentication apparatuses disposed at different locations, each of the authentication apparatuses being configured to perform authentication processing on each user who requests to use a machine, the management apparatus comprising:

a memory to store authentication information including one or more identification information of each user, the authentication information is used for authenticating each user when each user is to use the machine; and circuitry to in response to receiving a request for determining whether to allow an additional registration of the authentication information received from the authentication apparatus, determine whether the additional registration of the received authentication information of the user is allowed based on the number of authentication information of the user already stored in the memory, transmit a determination result indicating whether the additional registration of the received authentication information of the user is allowed or not allowed to the authentication apparatus, and register the authentication information of the user additionally in the memory when the determination result indicates that the additional registration of the received authentication information of the user is allowed, wherein the memory stores an upper limit of the number of media ownable by each user, each medium to be used for authenticating the user who requests to use the machine, and the number of media already owned by the user, wherein when the circuitry acquires the authentication information of the user from one additional medium owned by the user, the circuitry compares the upper limit of the number of media ownable by the user and the number of media already owned by the user and stored in the memory to determine whether the additional registration of the authentication information of the user, requested by using the one additional medium, is allowed, wherein the circuitry of the management apparatus sends the number of authentication information of the user, stored in the memory, to the authentication apparatus, and wherein when the management apparatus does not return a reply to the authentication apparatus in response to the request for determining whether to allow the additional registration received from the authentication apparatus, the authentication apparatus determines whether the additional registration of the authentication information of the user is allowed based on the number of authentication information of the user stored in the authentication apparatus.

5. The management apparatus of claim 4, further comprising an operation interface used for setting the upper limit of the number of the media ownable by the each user, wherein when the upper limit is set via the operation interface, the circuitry compares the set upper limit and the number of the media currently owned by the user and stored in the memory to determine whether the number of the media currently owned by the user is less than the set upper limit, or equal to or greater than the set upper limit.

6. The management apparatus of claim 5, wherein the memory stores registration validity information determined for each user based on a comparison of the set upper limit and the number of the media currently owned by the user, wherein when the circuitry receives the request for determining whether to allow the additional registration from the authentication apparatus, the circuitry determines whether the additional registration of the authentication information of the user is allowed based on the registration validity information of each user stored in the memory.

7. A method of managing authentication information of each user by using a plurality of authentication apparatuses, each of the authentication apparatuses, connected with a managing apparatus, configured to perform authentication processing on each user who requests to use a machine, the method comprising:

storing authentication information including one or more identification information of each user in a memory, the authentication information is used for authenticating each user when each user is to use the machine;

receiving, from the authentication apparatus, authentication information of a user, input to the authentication apparatus by the user, and a request for determining whether the user at the machine is authenticated to use the machine;

performing, at the authentication apparatus, the authentication processing on the received authentication information of the user;

receiving, at the managing apparatus, from the authentication apparatus, a request for determining whether to allow an additional registration of the authentication information of the user that is not yet stored in the memory;

determining whether the additional registration of the received authentication information of the user is allowed based on the number of authentication information of the user already stored in the memory;

transmitting a determination result indicating whether the additional registration of the received authentication information of the user is allowed or not allowed to the authentication apparatus; and registering the authentication information of the user additionally in the memory when the determining determines that the additional registration of the received authentication information of the user is allowed, wherein the memory stores an upper limit of the number of media ownable by each user, each medium to be used for authenticating the user who requests to use the machine, and the number of media already owned by the user, wherein when the authentication information of the user is acquired from one additional medium owned by the user, comparing the upper limit of the number of media ownable by the user and the number of media already owned by the user and stored in the memory to determine whether the additional registration of the authentication information of the user, requested by using the one additional medium, is allowed, further comprising:

wherein, the number of authentication information of the user, already stored in the memory is sent to the authentication apparatus, from a management apparatus including the memory, and wherein when the management apparatus does not return a reply to the authentication apparatus in response to the request for determining whether to allow the additional registration received from the authentication apparatus, the authentication apparatus determines whether the additional registration of the authentication information of the user is allowed based on the number of authentication information of the user stored in the authentication apparatus.

8. The method of claim 7, wherein the management apparatus includes an operation interface used for setting the upper limit of the number of the media ownable by each user, wherein when the upper limit is set via the operation interface, comparing the set upper limit and the number of the media currently owned by the user and stored in the memory to determine whether the number of the media currently owned by the user is less than the set upper limit, or equal to or greater than the set upper limit.

9. The method of claim 8, further comprising:

storing registration validity information determined for each user in the memory based on a comparison of the set upper limit and the number of the media currently owned by the user stored in the memory, wherein when the request for determining whether to allow the additional registration is received from the authentication apparatus, the determining determines whether the additional registration of the authentication information of the user is allowed based on the registration validity information of each user stored in the memory.

* * * * *